June 6, 1967 — G. H. HURST, JR., ETAL — 3,323,387
GEAR SHIFT MECHANISM
Filed May 25, 1965 — 5 Sheets-Sheet 1

INVENTORS.
GEORGE H. HURST, JR.
WILLIAM G. CAMPBELL
BY
ATTORNEY.

INVENTORS.
GEORGE H. HURST, JR.
WILLIAM G. CAMPBELL
BY
ATTORNEY.

June 6, 1967  G. H. HURST, JR., ET AL  3,323,387
GEAR SHIFT MECHANISM

Filed May 25, 1965 5 Sheets-Sheet 3

INVENTORS.
GEORGE H. HURST, JR.
WILLIAM G. CAMPBELL
BY
ATTORNEY.

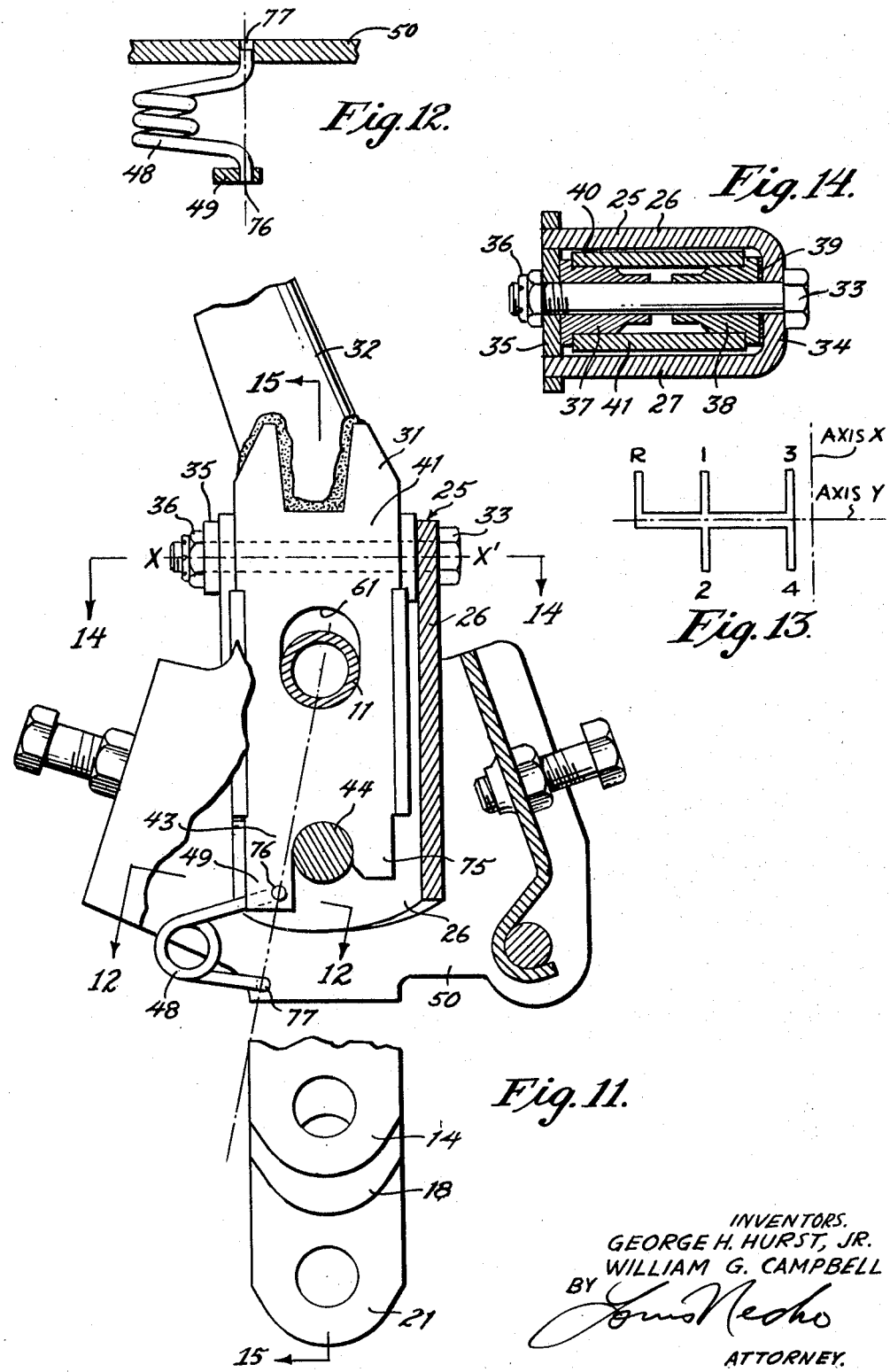

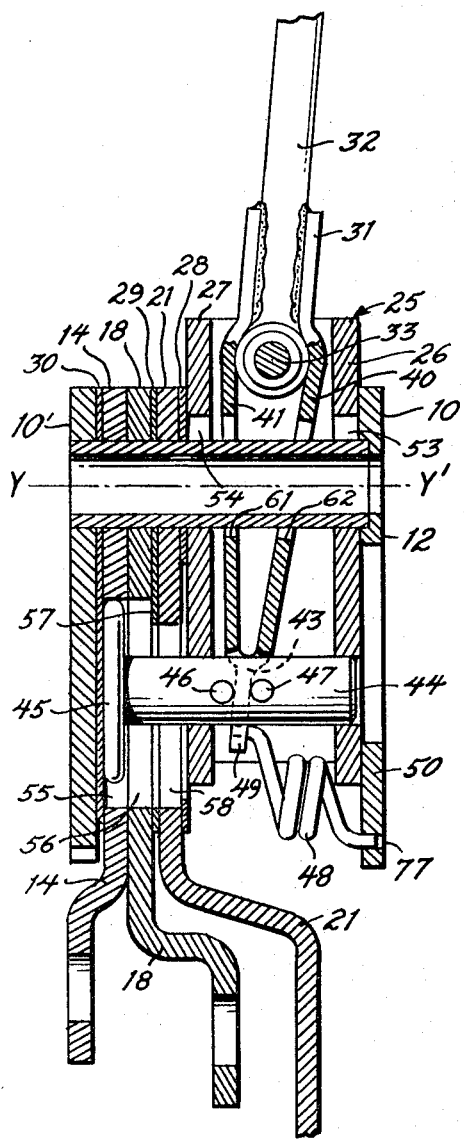
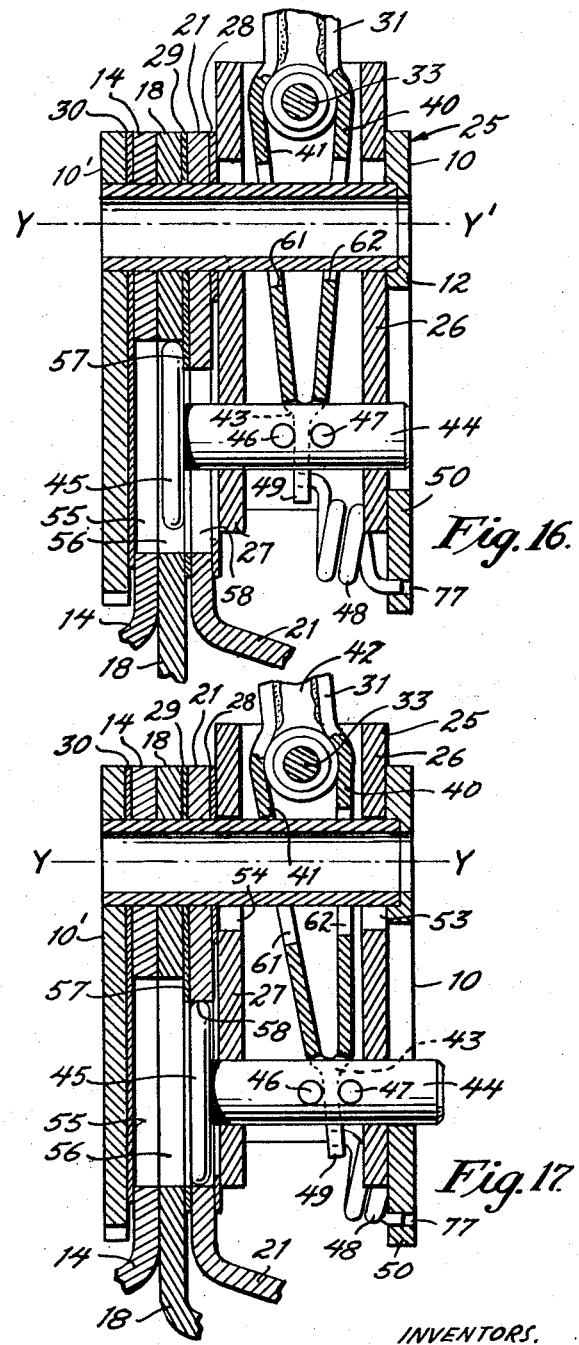
Fig. 15.
Fig. 16.
Fig. 17.
INVENTORS.
GEORGE H. HURST, JR.
WILLIAM G. CAMPBELL
BY
ATTORNEY.

United States Patent Office 3,323,387
Patented June 6, 1967

3,323,387
GEAR SHIFT MECHANISM
George H. Hurst, Jr., Abington, and William G. Campbell, Chalfont, Pa. (both of 341 W. Glenside Ave., Glenside, Pa. 19038)
Filed May 25, 1965, Ser. No. 458,574
1 Claim. (Cl. 74—476)

ABSTRACT OF THE DISCLOSURE

A gear shifting mechanism including a coil spring connected to the lower end of the shift stick and to the housing at a point below its point of connection to the shift stick, said spring exerting a lateral following pressure against the stick as it moves from the neutral gate to a gear selecting position; to facilitate shifting and to minimize rattling, said spring also exerting pressure against the movement of the handle from a forward speed into the reverse gear selecting position to prevent unintended shifting into reverse gear position.

---

This invention relates to a gear shifting mechanism of the general type disclosed in our Patent No. 3,052,135.

A gear shift mechanism of the type referred to includes a number of gear actuating levers which are connected by suitable linkage to corresponding transmission gear trains, and a manually operated shifting stick or handle for selectively moving said gear actuating levers to place the transmission in any desired forward, or in the reverse, gear position. In shifting mechanisms of the type referred to, the handle and the actuating levers are rotatable transversely of the axis of the assembly bolt, which passes through the handle at a point intermediate its ends, and the handle is also rockable longitudinally of the axis of said bolt for selective engagement with the gear actuating levers. Conventionally, the stick is biased by a horizontal coil spring which bears against the middle portion of the handle, and leaves the upper and lower portions of the handle free to rattle.

It is therefore an object of this invention to provide an improved construction wherein one end of the shifting handle also is adequately tensioned to minimize rattling.

The conventional spring which bears against the middle portion of the handle must be compressed, more, or less, by the shifting of the handle to one forward movement gear position or another, and this presents corresponding resistance which makes shifting more or less difficult.

It is therefore a further object of this invention to produce an improved construction whereby the spring which tensions the lower end of the stick also exerts following pressure as the handle is moved in up-shifting direction, and whereby said spring presents substantial resistance to the movement of the shift stick from a forward gear position into reverse gear position so as to prevent unintended shifting into reverse gear.

Gear shift mechanisms of the type described usually include a reverse lockout which prevents the reverse gear actuating lever from moving with an adjacent forward gear, actuating lever when the latter is moved to one of its gear selecting positions, and include a plate having an opening therein which receives the selector pin when it is moved into engagement with the reverse gear actuating lever, said opening being so located that the shifting handle must be deliberately depressed before the selector pin can be engaged with the reverse gear actuating lever.

Such gear shift mechanisms also include a special spring for biasing the handle upwardly.

It is therefore a further feature of this invention to produce an improved construction wherein the shifting handle is normally biased upwardly by the same spring which biases the lower end of the stick in the manner above set forth.

It is another object of this invention to provide a gear shift mechanism of the type described that is simple in operation, rugged in construction and trouble free in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIGURE 11 is similar to FIGURE 1 but showing the parts when the shifting stick is in neutral position.

FIGURE 12 is a sectional view looking in the direction of line 12—12 on FIGURE 11 and showing the position of the shifting stick and the spring with everything else omitted.

FIGURE 13 is a representation of the shifting pattern of a gear train capable of four forward and one reverse position.

FIGURE 14 is a sectional view looking in the direction of line 14—14 on FIGURE 11.

FIG. 15 is a sectional view looking in the direction of line 15—15 on FIG. 11 showing the parts with the shifting stick engaged with the third-fourth forward gear actuating lever.

FIG. 16 is a sectional view showing the shifting stick engaged with the first-second forward gear actuating lever.

FIGURE 17 is similar to FIGURE 15 but showing the shifting stick engaged with the reverse gear actuating lever.

Figures 1, 2:
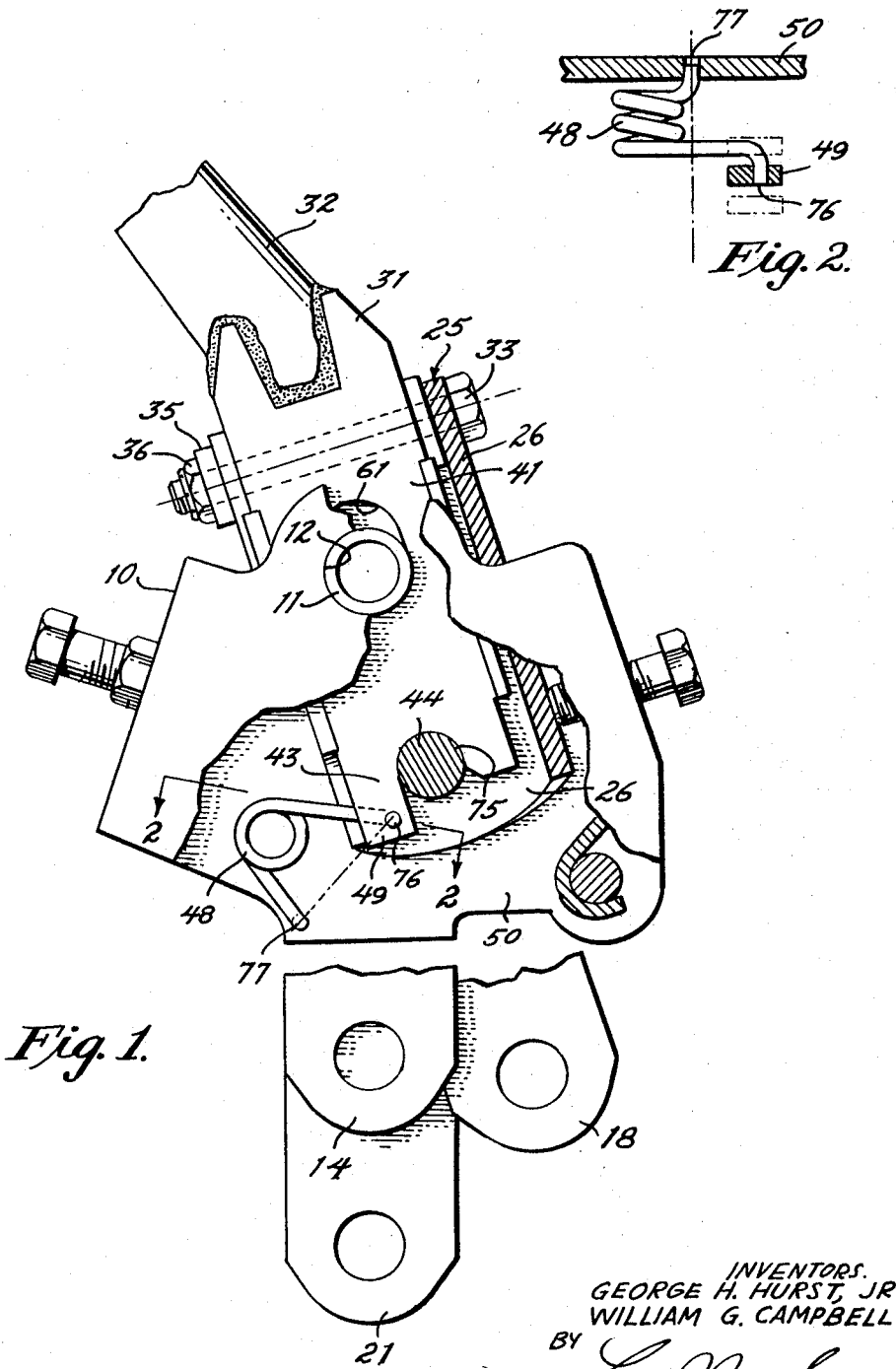
FIG. 1 is a side view, partly in section and partly in elevation, with some parts broken away showing the position of the parts when the shifting stick is in first gear position.
FIG. 2 is a sectional view looking in the direction of line 2—2 on FIG. 1 and showing the position of the shifting stick and the spring of this invention with everything else omitted.
Figure 4:
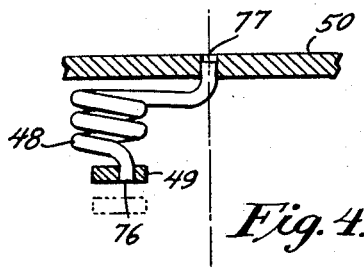
FIG. 4 is a sectional view looking in the direction of line 4—4 of FIG. 3 and showing the position of the handle and the spring with everything else omitted.
Figure 6:
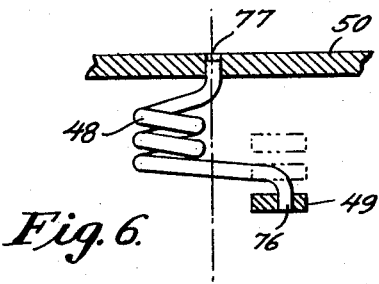
FIG. 6 is a sectional view looking in the direction of line 6—6 on FIG. 5 and showing position of the handle and spring with everything else omitted.
Figure 3:
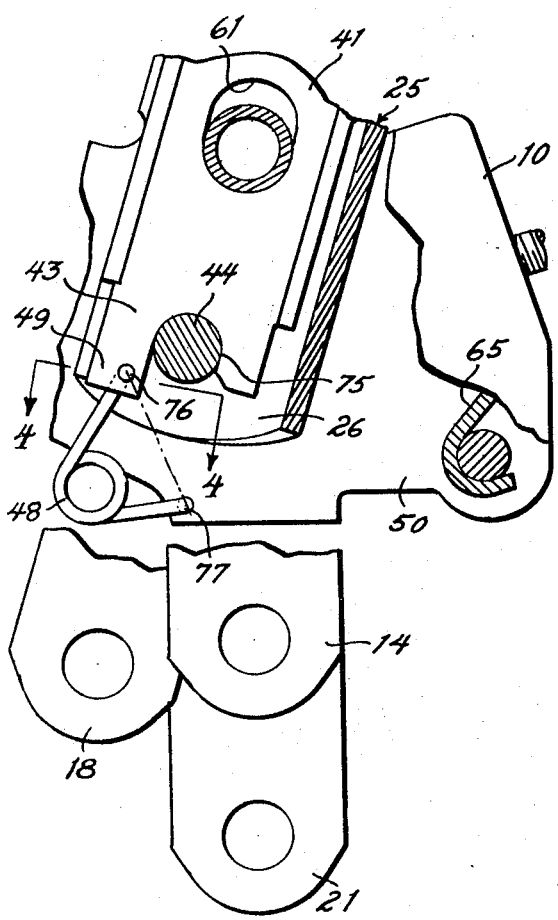
FIG. 3 is similar to FIG. 1 but showing the position of the parts when the shifting stick is in second gear position.
Figure 5:
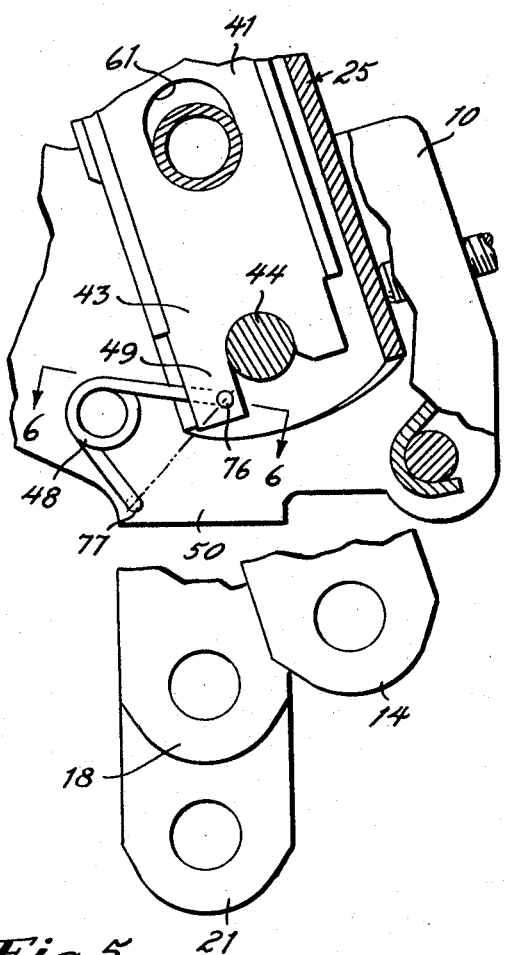
FIG. 5 is similar to FIG. 1 but showing the parts when the shifting stick is in third gear position.
Figure 8:
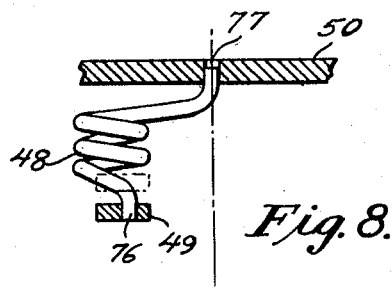
FIG. 8 is a sectional view looking the direction of line 8—8 on FIG. 7 and showing the position of the handle and the spring with everything else omitted.

It is to be noted that in FIGURES 15, 16 and 17 the shifting stick is shown in engagement with the respective gear selector levers but with the shifting stick in the neutral gate.

The gear shifting mechanism illustrated is of the same general type disclosed in our patent aforesaid and, therefore, it is not shown nor described in detail. It is thought enough to point out that, in the present disclosure, the invention is shown applied to the gear shifting mechanism of a transmission having four, instead of three, forward motion gear trains and that the invention is equally applicable to a transmission having less than four forward motion gear trains. It is also pointed out that, in this, as in the disclosure of the patent aforesaid, the rocking motion of the shifting handle longitudinally of the assembly bolt engages the handle with the desired gear actuating lever and that rotation of the handle transversely of the assembly bolt moves the selected, forward motion, gear actuating lever to either of its positions, all as set forth in our previous patent.

Referring now to the drawings, the gear shifting mechanism illustrated comprises an outer casing only side walls 10 and 10' of which are shown and need be considered. The outer casing carries a horizontal supporting sleeve 11 which is secured to wall 10 as at 12 and is adapted to receive an assembly bolt which secures the casing to the transmission housing, or other support in the manner shown in the patent aforesaid. Sleeve 11 rotatably supports third and fourth gear shift actuating lever 14; first and said gear shift lever 18, and reverse gear actuating lever 21. The manner in which the lower ends of the actuating levers are connected to the transmission arms is also shown in the patent aforesaid. Sleeve 11 also rotatably supports a U-shaped carrier 25 which is best shown in FIG. 14 and the equivalent of which is also disclosed in the patent aforesaid. Carrier 25 is so mounted that one side wall 26 thereof abuts wall 10 and the wall 27 thereof abuts plate 28 which in turn, abuts reverse gear actuating lever 21 to prevent movement of the reverse actuating lever with the rotation of carrier 25. Another plate 29 is interposed between the reverse gear actuating lever 21 and first and second gear actuating lever 18 and is so arranged as to prevent unintended shifting into reverse gear in the manner hereinafter set forth. If desired, a similar plate can be interposed between gear actuating lever 18 and third and fourth gear lever 14. A wave plate 30 is disposed between actuating lever 14 and wall 10' of the outer casing for tensioning levers 14, 18 and 21 and carrier 25 to reduce rattling.

As seen in FIGS. 14, 15, 16 and 17, U-shaped carrier 25 is secured to handle assembly 31 by means of a bolt 33 which passes through the bight portion 34 of the U-shaped carrier and through closure plate 35 to engage nut 36, FIG. 14. Handle assembly 31 includes an upper grip portion 32 and is supported by nylon bushings 37 and 38. A spring 39 tensions the assembly to reduce, or prevent rattling.

The shifting handle, or stick, assembly 31 also comprises a lower portion formed of arms 40 and 41 which are joined as at 43 and which terminate in a finger 49.

Arms 40 and 41 of the shifting stick are provided with openings 61 and 62 to permit movement of the handle 31 transversely and longitudinally, as well as up and down movement, relative to sleeve 11.

A selector pin 44 carries a gear shift engaging head 45 and is provided with pins 46 and 47, FIGS. 15 to 17, which are adapted to receive the lower end 49 of the shifting handle 31. By this arrangement, rocking the handle along the longitudinal axis Y—Y of sleeve 11 will move pin 44 into one or another of openings 55, 56, or 58 in actuating levers 14, 18 and 21, to engage pin 44, and hence shifting handle 31, with the corresponding gear actuating lever. The extent to which the handle is rocked determines the extent of axial movement of pin 44 and this determines whether the rotary movement of the handle about sleeve 11 will shift into first or second; or into third and fourth; or into reverse gear position. Pin 44 is freely movable in aligning openings provided in sidewalls 26, 27 of carrier 25. Since these openings serve no other function, they are not described.

As seen in FIGS. 1, 3, 5, 7, 9 and 11, finger 49 is detachably engageable with pin 44 by means of a downwardly facing yoke 75 which rides on selector pin 44 between the above mentioned pins 46 and 47.

According to this invention, and as shown in FIGS. 15, 16 and 17, a spring 48 is secured at one end 77 thereof to the lower end 50 of housing wall 10 and is secured at its other end 76 to finger 49 of the shifting stick. As can best be seen from FIGS. 15 to 17, spring 48 is so constructed and arranged that it continuously biases the lower end of shifting stick assembly 31 upwardly and away from the housing wall 50 and, by referring to FIGS. 15, 16 and 17, it will be noted that spring 48 is at maximum compression when the handle 31 is rocked in a direction to engage pin 44 with reverse gear actuating lever 21; that it is under less compression when the selector pin 44 engages the first and second gear actuating lever 18, and that spring 48 is under least compression when pin 44 engages third and fourth gear selector lever 14. It will also be seen that, as a result of the upward bias of spring 48, the bottom edges of openings 53, 54, in the sidewalls 26, 27, of carrier 25 will normally bear on bottom of sleeve 11 as shown in FIGS. 15 and 16. In this position, engaging head 45 may be engaged with one or the other of levers 14 and 18 without depressing the shifting handle. But, in the upper position of the handle, engaging head 45 can not be moved into opening 58 in reverse actuating gear 21 and, to engage the handle 31 with the reverse gear 21, it is necessary to push handle 31 downwardly until the upper edges of openings 53 and 54 ride on the top of sleeve 11. See FIG. 17. By this arrangement, it is impossible to shift into reverse gear without consciously and intentionally, fully compressing spring 48.

Figure 10:
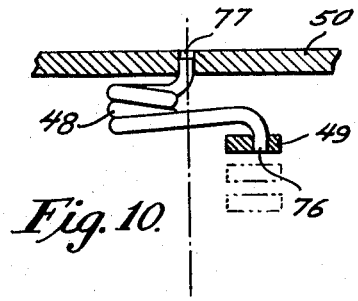
FIG. 10 is a sectional view looking in the direction of line 10—10 on FIG. 9 and showing the position of the handle and the spring with everything else omitted.
Figure 7:
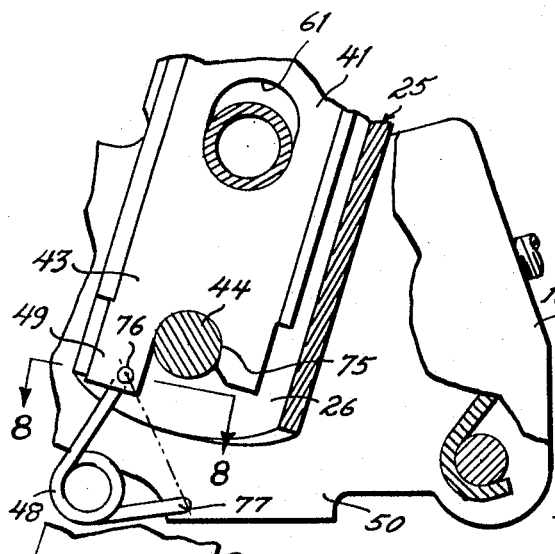
FIG. 7 is similar to FIG. 3 but showing the parts when the shifting stick is in fourth gear position.
Figure 9:
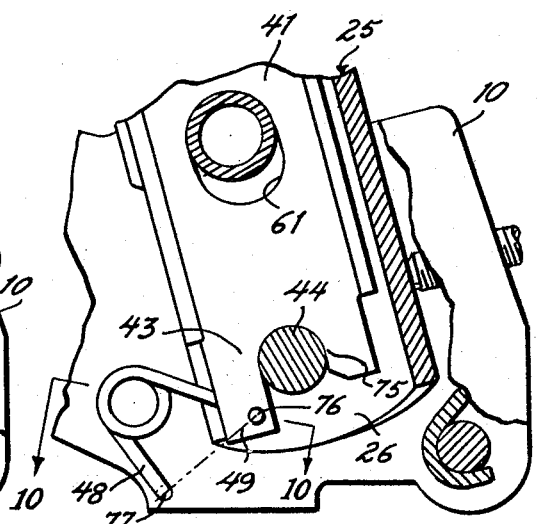
FIG. 9 is similar to FIG. 1 but showing the parts when the shifting stick is in reverse position.

It will be seen from FIGS. 10 and 17 that the distance between the ends 76 and 77 of spring 48 is shortest when pin 44 engages reverse gear lever 21; that the distance between the ends of spring 48 increases slightly when pin 44 is engaged with gear actuating lever 18 and that the distance between ends 76 and 77 of the spring again increases slightly when pin 44 is engaged with gear actuating lever 14. It will be noted that the foregoing reference to the distance between the ends of spring 48 applies when actuating levers 14, 18 and 21 are in the neutral position and that, when actuating lever 21 is moved from the neutral to reverse gear position, the distance between the ends of spring 48 increases with reference to the distance when the reverse lever is in neutral position. The same is of course true when lever 18 is moved to first or to second gear position and when gear 14 is moved to third or fourth gear position. It will thus be seen that as the gear actuating levers are moved away from the neutral position, spring 48 exerts a following pressure in the direction of movement of the handle thus aiding the movement of the handle instead of opposing it as in a construction in which the handle is tensioned by a spring coaxial with sleeve 11 or its equivalent. It will be remembered that spring 48 keeps handle 31 in its upper position to prevent engagement of pin 44 with reverse gear 21 unless spring 48 is deliberately fully compressed, as in FIG. 17 by conscious depression of handle 31.

From the foregoing it will be seen that in addition to preventing accidental shifting to reverse gear, the spring also helps in moving the shifting handle and the actuating lever engaged thereby, to the selected gear position. It will also be seen that the lateral and upward pressure of spring 48 against the end 49 of the shifting stick, or at point remote from its substantially central fulcrum, is more effective in preventing rattling as compared with the pressure exerted by a spring of the same strength which presses against the central portion of the handle.

It will be seen from the foregoing that, by this invention, we use a single spring which biases the engaging head toward the gear actuating levers and which simultaneously raises the handle to prevent shifting into reverse gear unless a conscious, deliberate effort is made to depress the shifting handle. It will also be noted that the bottom of the housing is open and that the spring is readily accessible for servicing.

What we claim is:

In a gear shift mechanism which includes:
a housing,
at least one rotatable forward gear actuating lever,
a rotatable reverse gear actuating lever,
a shifting stick,
a gear actuating lever selector carried by said handle,
means mounting said handle for up and down movement relative to said housing,
and means mounting said handle for rocking movement relative to a longitudinal axis for engaging said selector with a gear actuating lever and for rotation transversely of said axis to move the engaged gear actuating lever to a selected position, the improvement which consists of a coiled spring, one end of which is connected to the lower portion of the shifting stick and the other end of which is connected to said housing at a point below its connection to the stick, whereby said spring exerts a following pressure against the lower end of the handle in the direction of its movement into engagement with a gear actuating lever and in an upward direction.

References Cited
UNITED STATES PATENTS

| | | | |
|---|---|---|---|
| 2,077,578 | 4/1937 | Neracher | 74—473 |
| 3,018,670 | 1/1962 | Lohn | 74—477 |
| 3,052,135 | 9/1962 | Hurst et al. | 74—473 |
| 3,082,638 | 3/1963 | Nilson | 74—473 |
| 3,082,639 | 3/1963 | Almquist | 74—473 |

MILTON KAUFMAN, *Primary Examiner.*